United States Patent
Auten et al.

(10) Patent No.: US 10,218,793 B2
(45) Date of Patent: Feb. 26, 2019

(54) SYSTEM AND METHOD FOR RENDERING VIEWS OF A VIRTUAL SPACE

(71) Applicant: DISNEY ENTERPRISES, INC., Burbank, CA (US)

(72) Inventors: Robert Auten, Burbank, CA (US); Malcolm E. Murdock, Burbank, CA (US); Joshua Nakaya, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/181,403

(22) Filed: Jun. 13, 2016

(65) Prior Publication Data
US 2017/0358137 A1    Dec. 14, 2017

(51) Int. Cl.
| | |
|---|---|
| A63F 13/00 | (2014.01) |
| H04L 29/08 | (2006.01) |
| G06F 3/01 | (2006.01) |
| G06T 15/50 | (2011.01) |
| H04L 29/06 | (2006.01) |

(52) U.S. Cl.
CPC .............. *H04L 67/12* (2013.01); *A63F 13/00* (2013.01); *G06F 3/011* (2013.01); *G06T 15/503* (2013.01); *H04L 67/38* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 4,689,616 | A * | 8/1987 | Goude | G06T 15/10 345/640 |
| 7,663,648 | B1 * | 2/2010 | Saldanha | G06T 17/00 345/419 |
| 8,508,550 | B1 | 8/2013 | Jenny | |
| 9,529,424 | B2 * | 12/2016 | Hilliges | G06F 3/011 |
| 2002/0158873 | A1 * | 10/2002 | Williamson | G06T 15/20 345/427 |
| 2006/0028473 | A1 * | 2/2006 | Uyttendaele | G06T 15/205 345/473 |
| 2007/0019888 | A1 * | 1/2007 | Larking | G06T 11/60 382/302 |
| 2008/0215994 | A1 * | 9/2008 | Harrison | A63F 13/10 715/757 |
| 2009/0066786 | A1 | 3/2009 | Landa | |
| 2009/0313584 | A1 | 12/2009 | Kerr | |
| 2010/0110069 | A1 | 5/2010 | Yuan | |
| 2010/0169837 | A1 * | 7/2010 | Hyndman | G06F 3/04815 715/848 |

(Continued)

*Primary Examiner* — Jitesh Patel
(74) *Attorney, Agent, or Firm* — Sheppard Mullin Richter & Hampton LLP

(57) ABSTRACT

Systems and methods for rendering views of a virtual space are presented herein. In some implementations, the views of the virtual space may be provided in a set of layers. Individual layers may include certain virtual space content within the views. Operations of a system and/or method presented herein include one or more of obtaining pre-rendered views of virtual space content associated with one or more layers, rendering views of other virtual space content associated with one or more other layers in real-time, or near real-time, based on user input, and/or other operations.

18 Claims, 5 Drawing Sheets

(56) References Cited

U.S. PATENT DOCUMENTS

| | | | |
|---|---|---|---|
| 2010/0302015 A1* | 12/2010 | Kipman | G06F 3/011 340/407.1 |
| 2011/0154266 A1 | 6/2011 | Friend | |
| 2011/0227938 A1* | 9/2011 | Lan | G06T 15/005 345/581 |
| 2011/0254835 A1 | 10/2011 | Segal | |
| 2012/0120066 A1 | 5/2012 | Hirota | |
| 2013/0009994 A1* | 1/2013 | Hill | G06N 3/006 345/633 |
| 2013/0033483 A1* | 2/2013 | Im | G06F 3/017 345/419 |
| 2013/0127838 A1 | 5/2013 | Derrig | |
| 2013/0222385 A1* | 8/2013 | Dorsey | G06T 11/20 345/427 |
| 2013/0265296 A1 | 10/2013 | Chan | |
| 2013/0268882 A1 | 10/2013 | Roh | |
| 2013/0321408 A1* | 12/2013 | Turner | H04N 13/026 345/419 |
| 2014/0173721 A1* | 6/2014 | Shenfield | G06F 3/0488 726/21 |
| 2014/0179421 A1* | 6/2014 | Quinn | A63F 13/00 463/31 |
| 2015/0215611 A1* | 7/2015 | Wu | H04N 13/0022 345/419 |
| 2016/0021357 A1* | 1/2016 | Alrajab | H04N 13/0207 348/46 |
| 2017/0103562 A1 | 4/2017 | Mitchell | |

* cited by examiner

SYSTEM AND METHOD FOR RENDERING VIEWS OF A VIRTUAL SPACE

FIELD OF THE DISCLOSURE

This disclosure relates to rendering views of a virtual space.

BACKGROUND

Traditional pipelines for high fidelity video game animation generally may take one of two approaches for mobile experiences. For example, either a high-fidelity animation is pre-rendered on a more powerful machine and exported to a mobile device as a linear clip, or a game engine runs locally on the mobile device to render out an interactive, but much lower fidelity, animated experience in real time. These two paths force the content creator to choose between high-fidelity but static pre-rendered sequences, or low fidelity but interactive locally rendered sequences.

SUMMARY

One aspect of the disclosure relates to a system configured for rendering views of a virtual space. The virtual space may comprise a video game taking place in the virtual space. The virtual space may be a virtual reality (VR) space. The system may be configured to facilitate generation of high-fidelity rendered interactive experiences for mobile computing platforms and/or other computing platforms. In some implementations, the views of the virtual space may be provided in a set of layers. Individual layers may include certain virtual space content associated with the views. Operations of system presented herein include one or more of obtaining pre-rendered views of virtual space content associated with one or more layers, rendering views of other virtual space content associated with one or more other layers in real-time, or near real-time, based on user input, and/or other operations. The layers may be streamed out to a computing platform. In some implementations, one or more pre-rendered views of one or more layers may be obtained from a virtual space server and streamed out to a computing platform. In some implementations, rendering of views of the virtual space of one or more other layers may be performed at the computing platform. By streaming out one or more pre-rendered views of the virtual space, and only rendering certain views of the virtual space in real time, a substantial amount of processing may be reduced. Such techniques may be advantageous when the real-time rendering may be performed at a mobile computing platform. However, in other implementations, the streaming of pre-rendered views and rendering of other views may be performed at the virtual space server, and streamed out together to a computing platform.

As described herein, the virtual space may comprise a virtual reality space that may facilitate 360 degrees of viewing within the virtual space. Users may be able to freely look in one or more direction during a scene. By way of non-limiting example, a computing platform may include a virtual reality headset, such as VR goggles, to participate in a free-looking VR experience. In such implementations, individual layers may correspond individual concentric spheres.

In some implementations, the system may comprise one or more of non-transitory electronic storage, one or more physical processors configured by machine-readable instructions, and/or other components. Executing the machine-readable instructions may cause the one or more physical processors to facilitate rendering views of a virtual space. The machine-readable instructions may comprise one or more of a space component, a layer component, a compositing component, and/or other components.

The space component may be configured to execute an instance of a virtual space and implement the instance of the virtual space to determine views of the virtual space. The virtual space may include virtual space content. The virtual space content may comprise one or more of topography, virtual objects, and/or other virtual space content. The implementation of an instance of the virtual space may be based on user participation in the virtual space. User participation may include controlling one or more available user-controlled virtual objects. Control may be exercised by providing user input via individual computing platform associated with individual users.

The layer component may be configured to associate virtual space content with individual discrete layers that may define the views of the virtual space. Individual layers may correspond to different depths of simulated depth-of-field within the views. By way of non-limiting example, the layers may comprise one or more of a first layer corresponding to a first simulated depth-of-field, a second layer corresponding to a second simulated depth-of-field, a third layer corresponding to a third simulated depth-of-field, and/or other layers.

The space component may be configured to determine and/or render views of the virtual space for individual layers based on associations of virtual space content with individual layers. In some implementations, determining the views may comprise one or both of obtaining one or more pre-rendered views of the virtual space and/or rendering (in real-time or near real-time) views of the virtual space based on user input. In some implementations, rendering individual layers may comprise rendering one or more portions of individual layers as transparent.

By way of non-limiting example, space component may be configured to determine views of the virtual space for presentation to a first computing platform. Determining and/or rendering the views may include one or more of rendering views of virtual space content associated with the first layer in real-time, or near real time, based on user input; obtaining, for the second layer, one or more pre-rendered views of virtual space content associated with the second layer; obtaining, for the third layer, one or more pre-rendered views of virtual space content associated with the third layer; and/or other operations.

The compositing component may be configured to composite layers. By way of non-limiting example, the compositing component may be configured to composite one or more of the first layer, second layer, third layer, and/or other layers into a composited view of the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
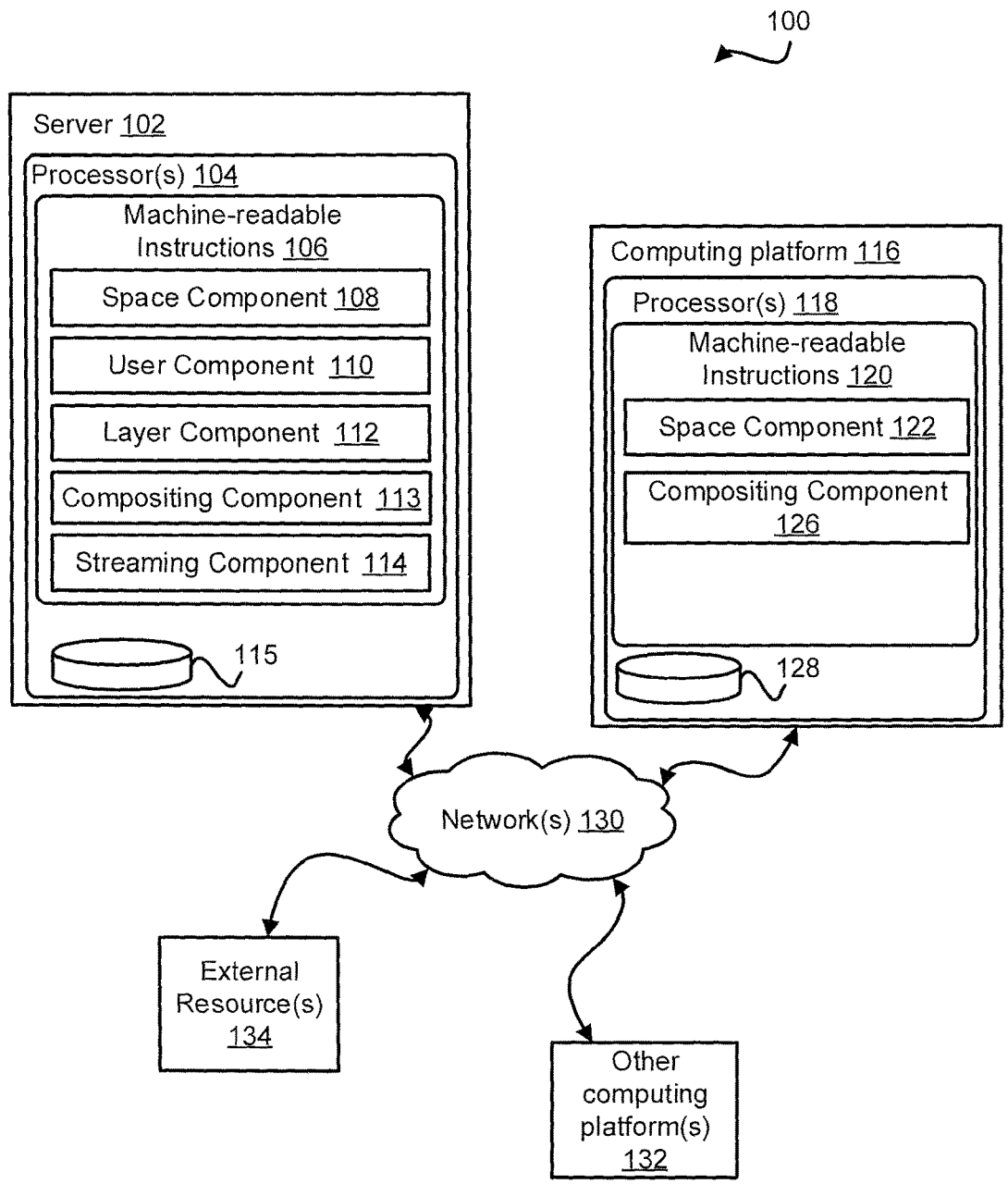
FIG. 1 illustrates a system configured for rendering views of a virtual space, in accordance with one or more implementations.

FIG. 1 illustrates a system 100 configured for rendering views of a virtual space, in accordance with one or more implementations. The system 100 may include one or more of one or more servers (e.g., server 102 and/or other servers), one or more computing platforms (e.g., computing platform 116 and/or one or more other computing platforms 132), and/or other components. It is noted herein that one or more references made to computing platform 116 are provided for illustrative purpose and is not to be considered limiting. For example, one or more features and/or functions attribute to computing platform 116 may be similarly attributed to individual ones of the one or more other computing platforms 132.

In some implementations, computing platform 116 may be configured to communicate with server 102 according to a client/server architecture and/or other communication scheme. In some implementations, computing platform 116 may communicate with one or more other computing platforms 132 according to a peer-to-peer architecture, via communications routed through server 102, and/or other communication schemes. Individual users may access system 100 and/or a virtual space via individual computing platforms. Computing platform 116 may include one or more of a cellular telephone, a smartphone, a laptop, a tablet computer, a desktop computer, a television set-top box, a client device, a smart TV, a gaming console, and/or other device suitable for the intended purposes as described herein.

Server 102 may include one or more of one or more physical processors 104 configured by machine-readable instructions 106, non-transitory electronic storage 115, and/or other components. Executing the machine-readable instructions 106 may cause one or more physical processors 104 to facilitate rendering views of a virtual space. The machine-readable instructions 106 may include one or more of a space component 108, a user component 110, a layer component 112, a compositing component 113, a streaming component 114, and/or other components.

The space component 108 may be configured to implement one or more instances of the virtual space executed by machine-readable instructions 106 to determine views of the virtual space. The views may then be communicated (e.g., via streaming, via object/position data, and/or other communication schemes) from server 102 to computing platform 116 for presentation to one or more users (e.g., via streaming component 114 and/or other components). The views determined and presented to a given user may be based on user participation in the virtual space. By way of non-limiting example, the views determined and presented may correspond to a game entity and/or other available user-controlled virtual objects being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

In some implementations, the views of the virtual space determined by space component 108 of server 102 may include views comprising at least some of the virtual space content within the virtual space (see, e.g., layer component 112). In some implementations, views of the virtual space comprising other virtual space content within the virtual space may be determined by a space component 122 of computing platform 116.

The instance of the virtual space may comprise a simulated space that is accessible by one or more users via computing platform 116 that present the views of the virtual space to the one or more users. The simulated space may include virtual space content. Virtual space content may include one or more of virtual objects, topography, and/or other virtual space content. The simulated space may express ongoing real-time interaction by one or more users, and/or may include one or more virtual objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

Virtual objects may include one or more of virtual items, virtual goods, and/or other virtual objects. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a game entity, a troop or troop type, a pet, a virtual resource, and/or other virtual items and/or goods.

The above description of the manner in which views of the virtual space are determined by space component 108 is not intended to be limiting. The space component 108 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 108, users may control game entities, objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items and/or currency that the user can use (e.g., by manipulation of a game entity or other user controlled element) within the virtual space.

Control may be exercised through control inputs and/or commands input by the users through individual computing platforms. The users may interact with each other through communications exchanged within the virtual space. Such communications may include one or more of textual chat, instant messages, private messages, voice communications, and/or other communications. Communications may be received and entered by the users via their respective computing platform(s). Communications may be routed to and from the appropriate users through server 102.

User participation in the virtual space may include controlling game entities in the virtual space. A game entity may refer to a virtual object (or group of objects) present in the virtual space that represents an individual user. For example, a game entity may be a virtual character (e.g., an avatar) and/or other virtual objects. A group of game entities may include a group of virtual characters, virtual objects, and/or other content.

In some implementations, an instance of the virtual space may be persistent. That is, the virtual space may continue on whether or not individual players are currently logged in and/or participating in the virtual space. A user that logs out of the virtual space and then logs back in some time later may find the virtual space has been changed through the interactions of other players with the virtual space during the time the player was logged out. These changes may include changes to the simulated physical space, changes in the user's inventory, changes in other user's inventories, changes experienced by non-player characters, changes to the virtual items available for use in the virtual space, and/or other changes.

In some implementations, information used to determine views of the virtual space and/or otherwise implement an instance of the virtual space may be referred to as state information. State information may comprise one or more of user state information, space state information, and/or other information. User state information may describe state of a user and/or game entity controlled by the user. By way of non-limiting example, user state information may include one or more of control inputs by a user to control one or more available user-controlled virtual objects, the location of a game entity and/or other available user controlled virtual objects being controlled by the given user (e.g., to facilitate determining views that correspond to the game entity), view parameters associated with the user (e.g., to facilitate determining views presented to the given user), virtual item inventory describing virtual items available to the user in the virtual space (see, e.g., user component 108), and/or other information. Space state information may describe state of the simulated space that is accessed by a user. Space state information may describe one or more of the topography of the virtual space (e.g., which may depend on the location of the game entity associated with the user, and/or other information), one or more non-user controlled virtual objects positioned within the topography, and/or other information.

The user component 108 may be configured to access and/or manage one or more user identifications, user profiles, and/or user information associated with users of system 100. The one or more user identifications, user profiles, and/or user information may include information stored by computing platform 116, server 102, and/or other storage locations. The one or more user identifications, user profiles, and/or user information may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a computing platform identification associated with a user, a phone number associated with a user, gameplay information (e.g., attribute values of game entity attribute of one or more game entities associated with the user, and/or other information), and/or other information related to users.

The layer component 112 may be configured to associate virtual space content with discrete layers. Virtual space content that may be associated with a given layer may be included in the given layer when views of the virtual space are rendered (see, e.g., space component 108 and/or space component 122).

Figure 2:
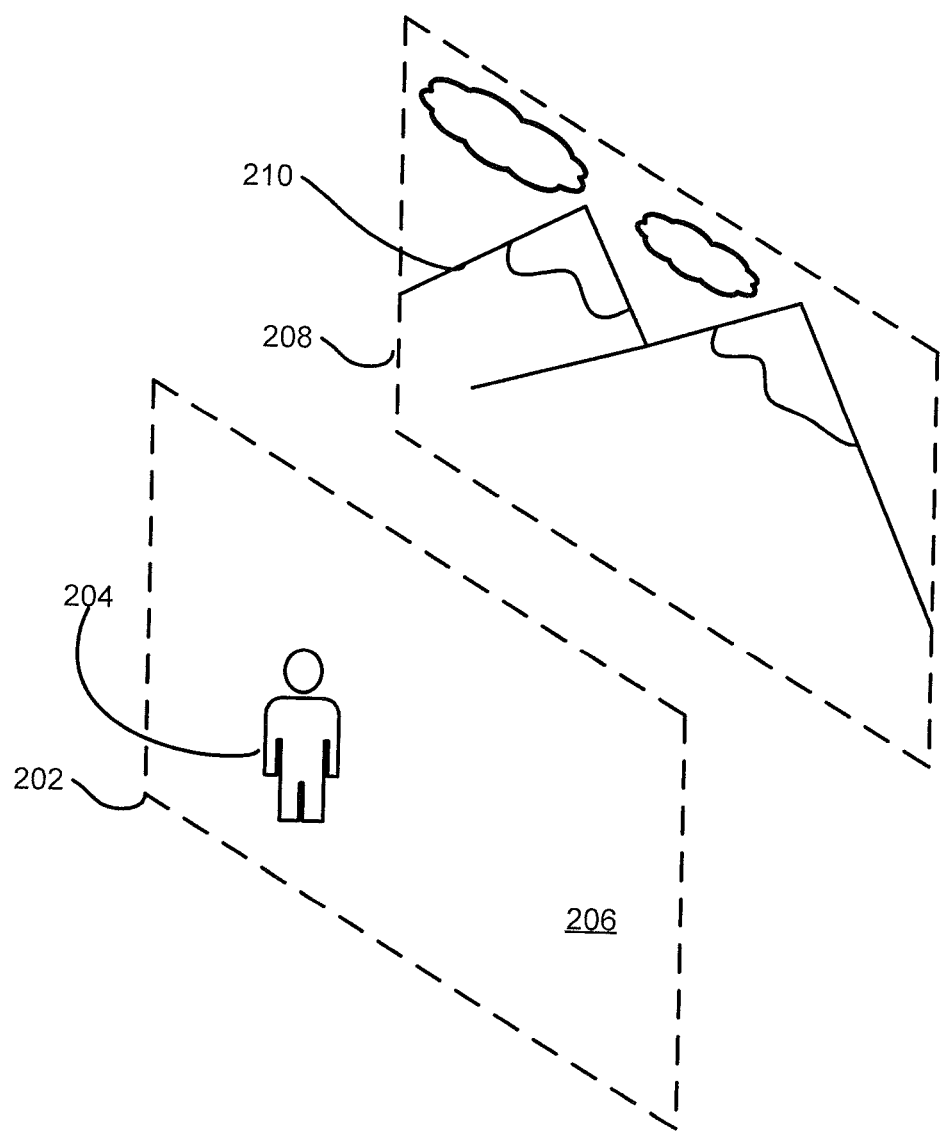
FIG. 2 shows a representation of a view of a virtual space depicting different layers that correspond with different depths of simulated depth-of-field within the view, in accordance with one or more implementations.
Figure 3:
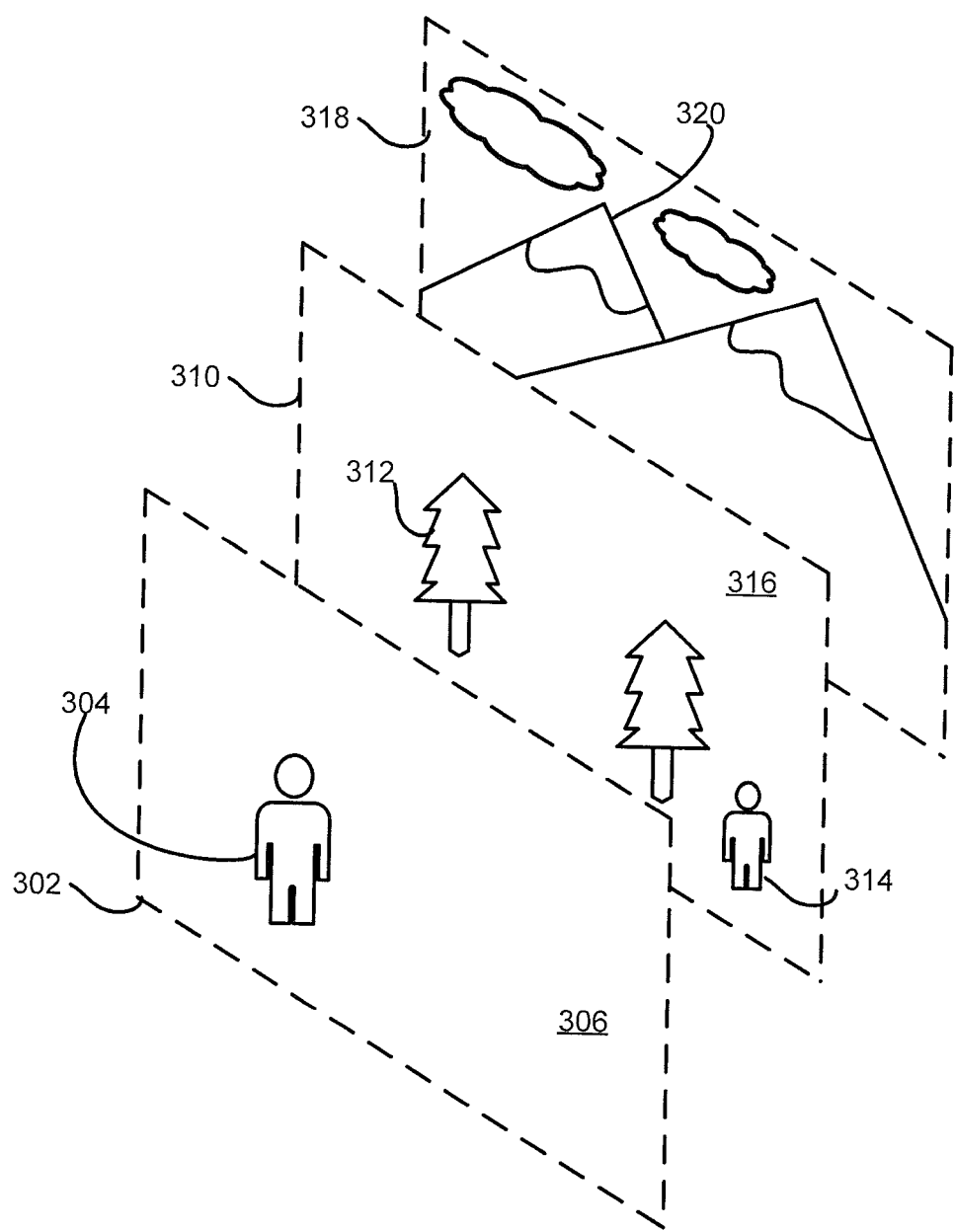
FIG. 3 shows another representation of a view of a virtual space depicting different layers that correspond with different depths of simulated depth-of-field within the view, in accordance with one or more implementations.

In some implementations, individual layers may correspond to different depths of simulated depth-of-field within the views (see, e.g., FIGS. 2 and 3). In some implementations, individual layers may include one or more of a first layer corresponding to a first simulated depth-of-field, a second layer corresponding to a second simulated depth-of-field, a third layer corresponding to a third simulated depth-of-field, and/or other layers.

In some implementations, virtual space content may be associated with individual layers based on corresponding depth positions of the virtual space content. Corresponding depth positions of virtual space content may be determined based on intended perception of depth of the virtual space content. By way of non-limiting example, perceived depths of virtual space content may include one or more of a foreground, a mid-ground, a background, and/or other perceived depths of virtual space content in the views of the virtual space. Virtual space content within a foreground of views of the virtual space may be perceived by a viewing user as having a shallower simulated depth-of-field compared to virtual space content within a mid-ground and/or background of the views. Virtual space content within a mid-ground may be perceived as having a shallower simulated depth-of-field compared to virtual space content within a background, and/or may be perceived as having a deeper simulated depth-of-field compared to virtual space content within a foreground of the views.

By way of non-limiting illustration, the first layer may comprise a foreground layer, the second layer may comprise a mid-ground layer, the third layer may comprise a background, and/or other layers may have other simulated depths-of-field. In some implementations, virtual space content at the first simulated depth-of-field of the foreground layer may be perceived to be closer to the user (e.g., viewing the virtual space via a display of a computing platform) than virtual space content at the second simulated depth-of-field of the mid-ground layer. Virtual space content at the second simulated depth-of-field of the second layer may be perceived to be closer to the user than content at the third simulated depth-of-field of the background layer.

In some implementations, an association of virtual space content with a layer may be based on information provided with the virtual space content. By way of non-limiting example, information that defines virtual space content (e.g., source code, and/or other information) may include information that specifies different layers with which the virtual space content may be associated. In some implementations, content/layer association information may be provided as metadata associated with the virtual space content, provided in the source code itself, and/or provided in other ways. By way of non-limiting example, the source code may include "tags," "labels," and/or other information that may specify content/layer associations.

In some implementations, association of virtual space content with a given layer may be based on a content type of the virtual space content. Content type may include one or more of user-controlled, non-user controlled, interactive, non-interactive, static, reactive, and/or other types of virtual space content.

By way of non-limiting illustration, a user-controlled virtual object may be a target of user attention. The user-controlled virtual object may be perceived to be closer to the user than other virtual space content within views of the virtual space. Virtual space content that may be user-controlled may be assigned to one or more layers that correspond to one or more depths that may be perceived to be closer to the user than other layers. For example, the user-controlled virtual object may be associated within a foreground layer, a mid-ground layer, and/or other layer that may define the views of the virtual space.

By way of non-limiting illustration, topography of the virtual space may be one or more of static virtual space content, reactive virtual space content, and/or other types of virtual space content. In some implementations, static virtual space content may correspond to virtual space content that may not appear to exhibit locomotion within views of the virtual space as viewpoint moves throughout dimensions of the virtual space. By way of non-limiting example, topography and/or topography elements such as a distant landscape, simulated weather, and/or other virtual space content may not appear to exhibit locomotion within views of the virtual space. In some implementations, static virtual space content may be associated with layers that may be perceived to be farther from the user than other virtual space content and/or may be associated with other layers.

Reactive virtual space content may correspond to virtual space content that may appear to exhibit locomotion within views of the virtual space as viewpoint moves through the dimensions of the virtual space. By way of non-limiting example, reactive virtual space content may "shift" within views of the virtual space as a viewpoint moves through virtual space (e.g., based on a parallax effect). Such virtual space content may include one or more virtual objects (e.g., buildings, non-player characters, and/or other virtual objects), topography elements (e.g., scenery elements such as plants, topographical surfaces, and/or other topography), and/or other virtual space content. In some implementations, reactive virtual space content may be associated with layers that may be perceived to be farther from the user than other virtual space content (e.g., user-control virtual objects, and/or other virtual space content), however closer to the user than some other virtual space content (e.g., static virtual space content and/or other virtual space content). In some implementations, reactive virtual space content may be associated with one or more of a mid-ground layer, background layer, and/or other layers.

In some implementations, association of virtual space content with a given layer may be based on availability of interaction of the virtual space content with one or more user-controlled virtual objects. By way of non-limiting example, non-user controlled virtual objects may be of a content type that may or may not interact with a user-controlled virtual object. Interaction may include one or more of responding to locomotion of a user-control virtual object, responding to commands input by a user, coupling with a user-controlled virtual object, fighting with a user-controlled character, talking with a user-controlled character, and/or other types of interaction. Non-user controlled objects may be a target of user attention based on availability of interaction (or lack of interaction) with a user controlled virtual objects. Non-user controlled virtual objects that may not interact with a user-controlled virtual object may be associated with one or more layers that may not include user-controlled virtual objects. For example, non-user controlled virtual objects that may not interact with a user-controlled virtual object may be associated with a layer that may include background topography of the virtual space and/or other virtual space content.

Non-user controlled virtual objects of the interactive type may be associated with one or more layers that may include user controlled virtual objects and/or other content. For example, a non-user controlled virtual object that may interact with a user-controlled virtual object may be associated with a layer that may include the user-controlled virtual object.

In some implementations, assocaiton of virtual space content with given layers may be made regardless of an intended perceived simulated depth in the virtual space. By way of non-limiting example, a non-user controlled virtual object that may not interact with a user-controlled virtual object may be associated with a background layer that may include background topography of the virtual space. However, the non-user control virtual object may be intended to be perceived closer to the user than the background topography. In such implementations, one or more of the size, manner and/or behavior of locomotion of the non-user controlled virtual object, and/or other aspects of the non-user controlled virtual object may be adjusted so that the non-user controlled virtual object may be perceived to be in a mid-ground and/or foreground of the views.

In some implementations, layer component 112 may be configured to determine one or more transparent areas of individual layers. The one or more transparent areas of individual layers may be determined based on the virtual space content associated with individual layers, and/or other information. By way of non-limiting example, the one or more transparent areas may comprise one or more areas surrounding the virtual space content of a given layer. The one or more transparent areas may be determined such that after compositing layers, a layer that may otherwise occlude another layer (e.g., be "on top" of the other layer) may indeed not occlude the other layer at least in the one or more transparent areas. In some implementations, transparency of a pixel may be conveyed by an alpha channel value and/or other information. When an area may be determined to be transparent, the area and/or the pixels may have an alpha channel set to zero and/or other values. In some implementations, rendering one or more areas of individual layers as transparent may reduce one or more of bandwidth, storage costs, and/or processing costs for rendering (e.g., by a GPU and/or other components of server 102 and/or computing platform 116). In some implementations, transparent area determinations may be adjusted in real-time according to one or more of state of the virtual space, locations of virtual space content, user input, and/or other information.

In some implementations, associations by the layer component 106 may be determined based on one or more of a frame-by-frame basis, periodically, shot-by-shot basis, predetermined at the start of an implementation of a virtual space, and/or determined by other techniques.

In some implementations, space component 108 of server 102 may be configured to determine views that may correspond to one or more layers. In some implementations, space component 122 of computing platform 116 may be configured to determine views that may correspond to one or more other layers.

In some implementations, space component 108 may be configured to determine views of the virtual space that comprise virtual space content of one or more layers. In some implementations, views of the virtual space that comprise virtual space content of one or more layers may be pre-rendered views of the virtual space content. In some implementations, views of the virtual space that comprise virtual space content of one or more layers may be determined and rendered in real-time based on user input and/or other information.

In some implementations, space component 108 may be configured to obtain one or more pre-rendered views of the virtual space. In some implementations, the pre-rendered views may be obtained based on a current state of the virtual space as defined by state information and/or other information. For example, computing platform 116 may send a request to server 102 for views of the virtual space. Space component 108 may query the state information to determine one or more pre-rendered views of the virtual space to obtain. The obtained pre-rendered views may correspond to the state information (e.g., based on one or more of a location in the virtual space, topography at the location of the virtual space, and/or other user and/or space information described by the state information).

In some implementations, server 102 may be configured to store a library, or database, of one or more pre-rendered views of the virtual space. By way of non-limiting example, a library of pre-rendered views may be stored in electronic storage 115 and/or other storage locations that may be integral to server 102 and/or otherwise accessible by server 102. The views may be stored as one or more of individual pre-rendered frame images, sequences of pre-rendered frame images describing the virtual space over a period of time, video feeds, and/or other representations of views of the virtual space.

In some implementations, obtaining one or more pre-rendered views of the virtual space may comprise obtaining a first set of pre-rendered views at a first point in time, obtaining a second set of pre-rendered views at a second point in time, and/or obtaining other pre-rendered views of the virtual space at other points in time. In some implementations, switching between obtained sets of pre-rendered views may be contingent on user state information and/or other information. By way of non-limiting example, user input may dictate a transition from one topography of the virtual space to another. Background virtual space content associated with a layer may change based on the transition. For example, a user may provide input to traverse a user-controlled game entity from a first topography to a second topography (e.g., from inside a building to outside in a meadow). The space component 108 may be configured to obtain, at points in time corresponding to the user-controlled game entity being in the first topography, one or more pre-rendered views of the virtual space corresponding to the first topography. The space component 108 may be configured to obtain, at points in time corresponding to the user-controlled game entity being in the second topography, one or more pre-rendered views of the virtual space corresponding to the second topography. In some implementations, the one or more pre-rendered views may be provided as video feeds. In some implementations, transitioning from the first topography to the second topography may comprise switching, by the space component 108, from a first video feed to a second video feed.

In some implementations, space component 108 may be configured to determine and/or render views of the virtual space in real-time, or near real-time, based on user input and/or other state information. In some implementations, space component 108 may utilize one or more of a game engine, other software and/or hardware components for rendering views of the virtual space in real-time, or near-real time.

By way of non-limiting example, based on a first layer corresponding to a first simulated depth-of-field, a second layer corresponding to a second simulated depth-of-field, and/or a third layer corresponding to a third simulated depth-of-field, space component 108 may be configured to render views of virtual space content associated with the first layer in real-time based on user input; obtain, for the second layer, one or more pre-rendered views of virtual space content associated with the second layer; obtaining, for the third layer, one or more pre-rendered views of virtual space content associated with the third layer; and/or other operations. Virtual space content associated with the first layer may comprise one or more user-controlled virtual objects and/or other virtual space content. Virtual space content associated with the second layer may comprise one or more non-user controlled virtual objects positioned within the topography of the virtual space and/or other virtual space content. Virtual space content associated with the third layer may comprise topography of the virtual space and/or other virtual space content. In some implementations, one or more of the first layer, second layer, and/or third layer may have one or more areas that may be rendered as transparent (e.g., determined by layer component 112).

The compositing component 113 may be configured to composite layers. The composited layers may comprise a single "stacked" view of the virtual space. One or more transparent areas of one or more layers that may be represented at a relatively shallower depth-of-field may provide not occlude virtual space content shown in one or more layers at a relatively deeper depth-of-field. By way of non-limiting example, compositing component 113 may be configured to composite one or more of the first layer, second layer, third layer, and/or other layers to generate a composite view of the virtual space. In some implementations, a set of layers may correspond to a set of concentric spheres.

The streaming component 114 may be configured to effectuate presentation of views of the virtual space at one or more computing platforms. In some implementations, effectuating presentation of views of the virtual space may comprise one or more of encoding information defining individual layers and/or composited layers into a format that may be suitable (e.g., readable) for a given computing platform, communicating encoded information defining individual rendered layers and/or composited layers to a given computing platform over a network (e.g., network 130), and/or other operations. In some implementations, streaming component 114 may be configured such that communicating information to individual computing platforms comprises streaming the information in real-time, or near real-time, as it is determined by server 102 and/or computing platform 116.

By way of non-limiting example, based on the second layer and third layer being associated with one or more pre-rendered views, the compositing component 113 may be configured to composite the second layer and third layer. The space component 108 may be configured to render, in real-time or near real-time, views of virtual space content associated with the first layer based on user input. The streaming component 114 may be configured such that effectuating presentation of views of the virtual space at computing platform 116 comprises one or more of effectuating transmission over network 130 of the first layer as it is being rendered, effectuating transmission over network 130 of the composited second and third layers, and/or effectuating transmission of other information from server 102 to computing platform 116.

In FIG. 1, computing platform 116 may include one or more of one or more physical processors 118 configured by machine-readable instructions 120, electronic storage 128, and/or other components. Executing the machine-readable instructions 120 may cause one or more physical processors 118 to facilitate rendering views of a virtual space. Computing platform 116 may be configured to execute an instance of the virtual space and/or a video game taking place in the virtual space by using information stored by and/or local to computing platform 116 (e.g., a game cartridge, game disk, memory card/stick, USB memory stick, electronic storage, and/or other considerations), information obtained from server 102, and/or other information. The machine-readable instructions 120 may include one or more of a space component 122, a compositing component 126, and/or other components.

Space component 122 may be configured to implement one or more instances of a virtual space executed by machine-readable instructions 120 and/or server 102 to determine views of the virtual space. The views may be presented via a display of computing platform 116 to one or more users. The views determined by computing platform 116 may be combined with views that may be obtained from server 102 (e.g., obtained via streaming component 114 and/or other components). In some implementations, space component 122 may include some or all of the functionality attributed herein to space component 108 and/or other components of server 102.

In some implementations, space component 122 may be configured to render views of virtual space content of individual layers in real-time, or near-real time, based on user input via computing platform 116. By way of non-limiting example, space component 122 may utilize one or more of a game engine installed locally at computing platform 116, a cloud-based game engine that may be accessible to computing platform 116 over network 130, and/or other techniques for rendering views of the virtual space.

In some implementations, compositing component 126 may be configured to composite locally rendered views of virtual space content of individual layers with obtained composited pre-rendered views of virtual space content of individual layers (e.g., composited by compositing component 113 and streamed out to computing platform 116 via streaming component 114). In some implementations, compositing component 126 may be configured to render one or more areas of one or more layers as transparent.

Figure 4:
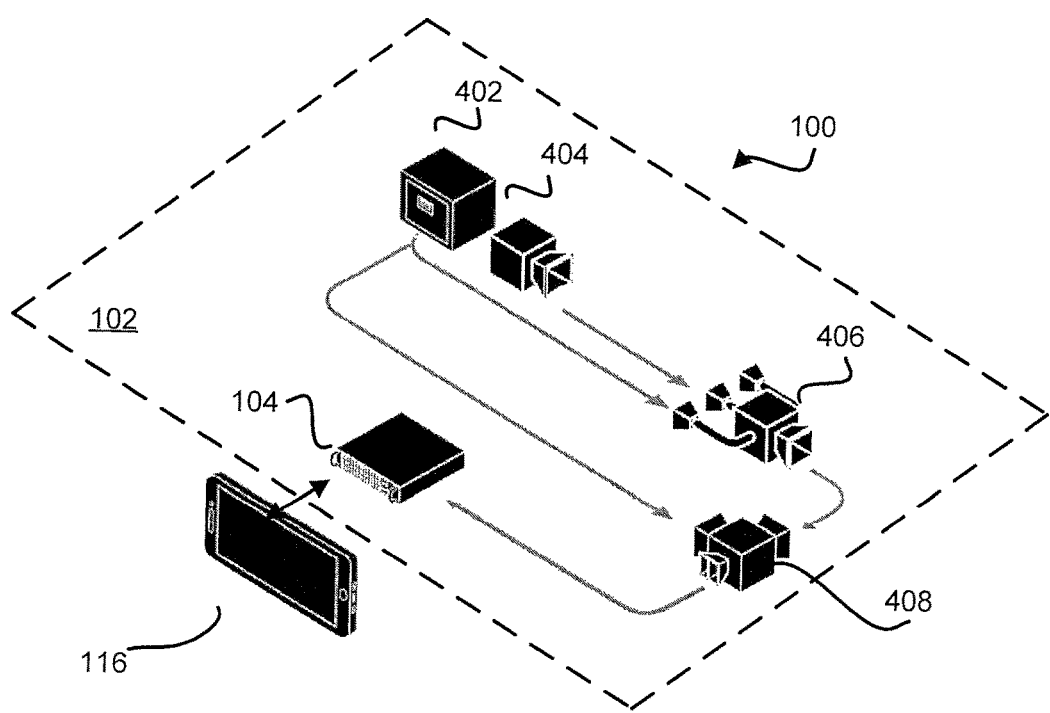
FIG. 4 illustrates an exemplary implementation of the system of FIG. 1.

By way of non-limiting example, FIG. 4 illustrates an exemplary implementation of system 100 of FIG. 1. In some implementations, server 102 may include one or more of a render library 402, a game engine 404, a compositing engine 406, an encoder 408, and/or other components. In some implementations, render library 402 may comprise a portion of electronic storage 115 (FIG. 1) that may store pre-rendered views of the virtual space. In some implementations, game engine 404 may comprise a software component of space component 108 and/or other components (FIG. 1). In some implementations, compositing engine 406 may comprise a software component of compositing component 113 and/or other components (FIG. 1).

The computing platform 116 may send a request to server 102 (e.g., one or more physical processor 104). Space component 108 may be queried for one or more of user state information (e.g., for factors such as location, past decisions, prior franchise history, and/or other user state information information), space state information, and/or other information. In some implementations, views of the virtual space may be defined by individual layers that are either pulled from render library 402 or rendered in real-time, or near real-time, via game engine 404. In some implementations, layers of pre-rendered views of the virtual space may be composited by compositing engine 408. In some implementations, views of the virtual space may be defined by individual layers that are either pulled from render library 402 or rendered in real-time, or near real-time, via computing platform 116. In some implementations, layers of pre-rendered views of the virtual space may be composited by compositing engine 408, while real-time, or near real-time, rendered views determined at computing platform 116 may be combined with the pre-rendered composited views streamed to the computing platform 116.

By way of illustration in FIG. 2, a first layer 202 of virtual space content and a second layer 208 of virtual space content are shown. The first layer 202 may be associated with virtual space content comprising a user-controlled virtual object 204, and/or other virtual space content. The second layer 208 may be associated with virtual space content comprising topography 210 and/or other virtual space content.

In some implementations, the first layer 202 may correspond to a first simulated depth-of-field. The second layer 208 may correspond to a second simulated depth-of-field. The first simulated depth-of-field may be shallower than the second simulated depth-of-field. By way of non-limiting illustration, virtual space content of first layer 202 may be perceived to be closer to the viewing user than virtual space content of second layer 208. By way of non-limiting example, first layer 202 may be a foreground layer, and second layer 208 may be a background layer.

In some implementations, views of the virtual space corresponding to the second layer 208 may be determined by obtaining, for the second layer 208, one or more pre-rendered views of the topography 210 of the virtual space. In some implementations, views of the virtual space corresponding to the first layer 202 may be determined by rendering, in real-time or near real-time, the virtual space content of the first layer (e.g., the user-controlled object 204 and/or other virtual space content) based on user input for controlling the user-controlled virtual object 204. In some implementations, rendering the virtual space content of the first layer 202 may include rendering one or more areas of the foreground layer as transparent. By way of non-limiting example, an area 206 surrounding the user-controlled object 204 may be determined to be transparent.

In some implementations, second layer 208 may include pre-rendered views of the virtual spaces. The second layer 208 may be streamed from server 102 (FIG. 1) to computing platform 116 (FIG. 1). The first layer 202 may be rendered in real-time, or near real-time, based on user input for controlling user-controlled object 204. In some implementations, first layer 202 may be rendered at server 102 (FIG. 1), combined with second layer 208, and streamed to computing platform 116 in an encoded format that may be suitable for computing platform 116. In some implementations, first layer 202 may be rendered at computing platform 116 (FIG. 1). Second layer 208 may be streamed to computing platform 116 in an encoded format, and combined with first layer 202 at computing platform 116 for presentation to a user.

By way of illustration in FIG. 3, a first layer 302 of virtual space content, a second layer 310 of virtual space content, and a third layer 318 of virtual space content are shown. The first layer 302 may be associated with virtual space content comprising a user-controlled virtual object 304, and/or other virtual space content. The second layer 310 may be associated with virtual space content comprising one or more virtual objects 312 positioned within a topography, a non-user controlled virtual object 314, and/or other virtual space content. The third layer 318 may be associated with virtual space content comprising topography 320 and/or other virtual space content.

In some implementations, first layer 302 may correspond to a first simulated depth-of-field. The second layer 310 may correspond to a second simulated depth-of-field. The third layer 318 may correspond to a third simulated depth-of-field. The first simulated depth-of-field may be shallower than the second and third simulated depth-of-field. The second simulated depth-of-field may be shallower than the third simulated depth-of-field. By way of non-limiting illustration, virtual space content of first layer 302 may be perceived to be closer to the viewing user than virtual space content of second layer 310 and/or third layer 318. Virtual space content of second layer 310 may be perceived to be closer to the viewing user than virtual space content of third layer 318. By way of non-limiting example, first layer 302 may be a foreground layer, second layer 310 may be a mid-ground layer, and third layer 318 may be a background layer.

In some implementations, second layer 310 and/or third layer 318 may include pre-rendered views of the virtual space. The second layer 310 and third layer 318 may be composited at server 102 (FIG. 1) and streamed to computing platform 116 (FIG. 1). The first layer 302 may be rendered in real-time, or near real-time, based on user input for controlling user-controlled object 304. In some implementations, first layer 302 may be rendered at server 102 (FIG. 1), combined with composited second layer 310 and third layer 318, and streamed to computing platform 116 in an encoded format that may be suitable for computing platform 116. In some implementations, first layer 302 may be rendered at computing platform 116 (FIG. 1). Composited second layer 310 and third layer 318 may be streamed to computing platform 116 in an encoded format, and combined with first layer 302 at computing platform 116 for presentation to a user.

Returning to FIG. 1, server 102, computing platform 116, one or more other computing platforms 132, external resources 134, and/or other components of system 100 may be operatively linked via one or more electronic communication links. For example, such electronic communication links may be established, at least in part, via a network (e.g., network(s) 130). Networks(s) 130 may comprise wired and/or wireless networks. Wireless networks may include one or more of the Internet, BLUETOOTH, and/or other networks. It will be appreciated that this is not intended to be limiting and that the scope of this disclosure includes implementations in which server 102, computing platform 116, one or more other computing platforms 132, external resources 134, and/or other components may be operatively linked via some other communication media.

The external resources 134 may include sources of information that are outside of system 100, external entities participating with system 100, and/or other resources. In some implementations, some or all of the functionality attributed herein to external resources 134 may be provided by resources included in system 100.

Server 102 may include electronic storage 115, one or more processors 104, and/or other components. Server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Computing platform 116 may include electronic storage 128, one or more processors 118, and/or other components. Computing platform 116 may include communication lines or ports to enable the exchange of information with a network and/or other computing platforms. Illustration of computing platform 116 in FIG. 1 is not intended to be limiting. The computing platform 116 may include a plurality of hardware, software, and/or firmware components operating together to provide the functionality attributed herein to computing platform 116. For example, computing platform 116 may be implemented by a cloud of computing platforms operating together as computing platform 116.

Electronic storage 115 and/or 128 may comprise electronic storage media that electronically stores information. The electronic storage media of the electronic storage may include one or both of storage that is provided integrally (i.e., substantially non-removable) with the respective device and/or removable storage that is removably connectable to the respective device. Removable storage may include, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 115 and/or 128 may include one or more virtual storage resources (e.g., cloud storage, a virtual private network, and/or other virtual storage resources). Electronic storage 115 and/or 128 may store files, software algorithms, information determined by processor(s), and/or other information that enables the respective devices to function as described herein.

Processor(s) 104 is configured to provide information-processing capabilities in server 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as single entity within server 102, this is for illustrative purposes only. In some implementations, processor(s) 104 may include one or more processing units. These processing units may be physically located within the same device or may represent processing functionality of a plurality of devices operating in coordination.

For example, processor 104 may be configured to execute machine-readable instructions 106 including components 108, 110, 112, 113, and/or 114. Processor 104 may be configured to execute components 108, 110, 112, 113, and/or 114 by software; hardware; firmware; some combination of software, hardware, and/or firmware; and/or other mechanisms for configuring processing capabilities on processor 104. It should be appreciated that, although components 108, 110, 112, 113, and/or 114 are illustrated in FIG. 1 as being co-located within a single processing unit, in implementations in which processor 104 includes multiple processing units, one or more of components 108, 110, 112, 113, and/or 114 may be located remotely from the other components. The description of the functionality provided by the different components 108, 110, 112, 113, and/or 114 described above is for illustrative purposes and is not intended to be limiting, as any of components 108, 110, 112, 113, and/or 114 may provide more or less functionality than is described. For example, one or more of components 108, 110, 112, 113, and/or 114 may be eliminated, and some or all of its functionality may be provided by other ones of components 108, 110, 112, 113, 114, and/or other components.

Processor(s) 118 is configured to provide information-processing capabilities in server 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as single entity within computing platform 116, this is for illustrative purposes only. In some implementations, processor(s) 118 may include one or more processing units. These processing units may be physically located within the same device or may represent processing functionality of a plurality of devices operating in coordination.

For example, processor(s) 118 may be configured to execute machine-readable instructions 106 including components 122 and/or 126. Processor(s) 118 may be configured to execute components 122 and/or 126 by software; hardware; firmware; some combination of software, hardware, and/or firmware; and/or other mechanisms for configuring processing capabilities on processor(s) 118. It should be appreciated that, although components 122 and/or 126 are illustrated in FIG. 1 as being co-located within a single processing unit, in implementations in which processor 118 includes multiple processing units, one or more of components 122 and/or 126 may be located remotely from the other components. The description of the functionality provided by the different components 122 and/or 126 described above is for illustrative purposes and is not intended to be limiting, as any of components 122 and/or 126 may provide more or less functionality than is described. For example, one or more of components 122 and/or 126 may be eliminated, and some or all of its functionality may be provided by other ones of components 122, 126, and/or other components.

Figure 5:
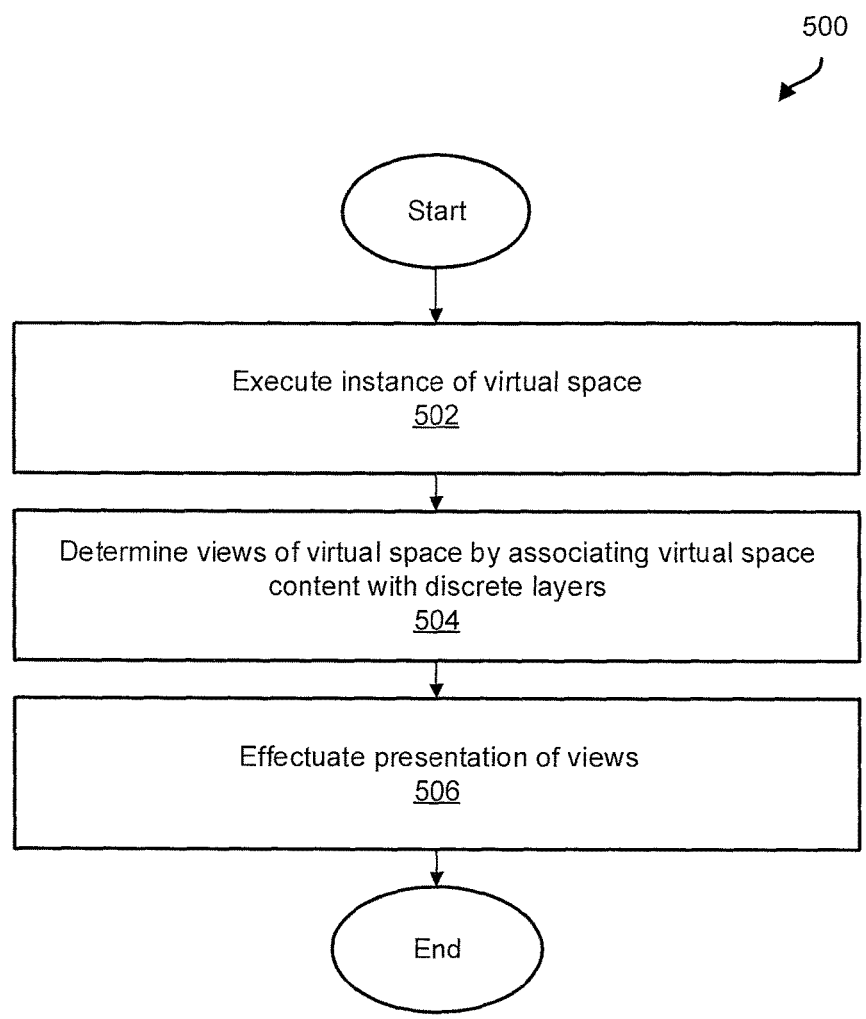
FIG. 5 illustrates a method of rendering views of a virtual space, in accordance with one or more implementations.

FIG. 5 illustrates an implementation of a method 500 of rendering views of a virtual space. The operations of method 500 presented below are intended to be illustrative. In some implementations, method 500 may be accomplished with one or more additional operations not described and/or without one or more of the operations discussed. Additionally, the order in which the operations of method 500 are illustrated in FIG. 5 and described below is not intended to be limiting.

In some implementations, method 500 may be implemented in a computer system including one or more of one or more processing devices (e.g., a computing platform, a server, a digital processor, an analog processor, a digital circuit designed to process information, an analog circuit designed to process information, a state machine, and/or other mechanisms for electronically processing information), non-transitory electronic storage, and/or one or more other components. The one or more processing devices may include one or more devices executing some or all of the operations of method 500 in response to instructions stored electronically on an electronic storage media. The one or more processing devices may include one or more devices configured through hardware, firmware, and/or software to be specifically designed for execution of one or more of the operations of method 500.

Referring now to method 500 in FIG. 5, at an operation 502, an instance of a virtual space may be executed. The instance may be implemented to determine views of the virtual space. The virtual space may include virtual space content. The virtual space content may comprise one or more of topography, virtual objects, and/or other content. The implementation of the instance of the virtual space may be based on user participation in the virtual space. User participation may include controlling one or more available virtual objects by providing user input via individual computing platform associated with individual users, and/or other types of participation. In some implementations, operation 502 may be performed by one or more physical processors executing a space component the same as or similar to space component 108 and/or space component 122 (shown in FIG. 1 and described herein).

At an operation 504, views of the virtual space may be determined. Views may be determined by associating virtual space content with discrete layers that define the views of the virtual space. Individual layers may correspond to different depths of simulated depth-of-field within the views. By way of non-limiting example, the layers may comprise one or more of a first layer corresponding to a first simulated depth-of-field, a second layer corresponding to a second simulated depth-of-field, a third layer corresponding to a third simulated depth-of-field, and/or other layers. In some implementations, operation 504 may be performed by one or more physical processor executing one or more of a space component the same as or similar to space component 108 and/or space component 122, and/or a layer component the same as or similar to layer component 112 (shown in FIG. 1 and described herein).

At an operation 506, presentation may be effectuated of views of the virtual space at computing platforms associated with individual users. By way of non-limiting example, effectuating presentation of views of the virtual space at a first computing platform may comprise one or more of rendering views of virtual space content associated with the first layer in real-time based on user input; obtaining, for the second layer, one or more pre-rendered views of virtual space content associated with the second layer; obtaining, for the third layer, one or more pre-rendered views of virtual space content associated with the third layer; compositing the second layer and third layer; and/or other operations. In some implementations, operation 506 may be performed by one or more physical processors executing one or more of a space component the same as or similar to space component 108 and/or space component 122, and/or a compositing component the same as or similar to compositing component 113 and/or compositing component 126 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to render views of a virtual space, the system comprising:
one or more physical processors configured by machine-readable instructions to:
execute an instance of a virtual space, and implement the instance of the virtual space to determine views of the virtual space, the virtual space including virtual space content, the virtual space content comprising topography and virtual objects, the implementation of the instance of the virtual space facilitating user participation in the virtual space, the user participation including controlling one or more available virtual objects to interact with the virtual space and one or more other virtual objects present in the virtual space, the control being exercised through user input via individual computing platforms associated with individual users;
determine views of the virtual space by associating virtual space content with discrete layers that define the views of the virtual space, individual layers corresponding to different depths of simulated depth-of-field within the views, the layers comprising a first layer corresponding to a first simulated depth-of-field, a second layer corresponding to a second simulated depth-of-field, and a third layer corresponding to a third simulated depth-of-field; and
effectuate presentation of views of the virtual space at computing platforms associated with individual users, wherein effectuating presentation of views of the virtual space at a first computing platform comprises:
rendering views of virtual space content associated with the first layer in real time based on user input by generating information defining the views of the virtual space content associated with the first layer, wherein the virtual space content associated with the first layer comprises one or more user-controlled virtual objects and a set of one or more non-user controlled objects present in the first layer, wherein rendering views of the virtual space content associated with the first layer in real time based on user input comprises rendering such views to reflect interaction between the one or more user-controlled virtual objects and the individual non-user controlled objects included in the set of one or more non-user controlled objects present in the first layer in accordance with user input controlling the one or more user-controlled virtual objects;
obtaining, for the second layer, one or more pre-rendered views of virtual space content associated with the second layer, the one or more pre-rendered views of the virtual space content associated with the second layer being obtained by obtaining pre-existing information defining the views of the virtual space content associated with the second layer;
obtaining, for the third layer, one or more pre-rendered views of virtual space content associated with the third layer, the one or more pre-rendered views of the virtual space content associated with the third layer being obtained by obtaining pre-existing information defining the views of the virtual space content associated with the third layer; and
compositing the second layer and third layer into a composited layer.

2. The system of claim 1, wherein rendering the first layer, obtaining one or more pre-rendered views of the virtual space content associated with the second layer and the third layer, and compositing the second layer and the third layer into the composited layer are performed at a server that is remote from the first computing platform, and wherein effectuating presentation of views of the virtual space at the first computing platform further comprises:
effectuating transmission of the first layer and the composited layer from the server to the first computing platform over a network.

3. The system of claim 1, wherein rendering the first layer is performed at the first computing platform, wherein obtaining one or more pre-rendered views of virtual space content associated with the second layer and the third layer, and compositing the second layer and the third layer into the composited layer are performed at a server that is remote from the first computing platform, and wherein effectuating presentation of views of the virtual space at the first computing platform further comprises:
effectuating transmission of the composited layer from the server to the first computing platform over a network; and
compositing, at the first computing platform, the first layer with the composited layer.

4. The system of claim 1, wherein the one or more physical processors are further configured by machine-readable instructions to:
determine, for individual layers, one or more areas of the individual layers that are to be rendered transparent, such that for the first layer determine a first area that is to be rendered transparent, and for the second layer, determine a second area that is to be rendered transparent.

5. The system of claim 1, wherein the one or more physical processors are further configured by machine-readable instructions such that:
virtual space content associated with the second layer comprises a second set of one or more non-user controlled virtual objects positioned within the topography of the virtual space; and
virtual space content associated with the third layer comprises the topography of the virtual space.

6. The system of claim 1, wherein effectuating presentation of views of the virtual space at the first computing platform further comprises:
obtaining, at a first point in time, a first set of pre-rendered views of virtual space content associated with the second layer; and
obtaining, at a second point in time, a second set of pre-rendered views of virtual space content associated with the second layer.

7. The system of claim 1, wherein the one or more pre-rendered views of virtual space content associated with the second layer, and the one or more pre-rendered views of virtual space content associated with the third layer comprise video feeds.

8. The system of claim 1, wherein virtual space is a three-dimensional virtual reality space.

9. The system of claim 1, wherein the virtual space includes a game taking place in the virtual space, wherein the one or more available virtual objects controlled by the users including game characters associated with the users.

10. A method to render views of a virtual space, the method being implemented in a computer system comprising one or more physical processor and non-transitory electronic storage storing machine-readable instructions, the method comprising:
executing an instance of a virtual space, and implementing the instance of the virtual space to determine views of the virtual space, the virtual space including virtual space content, the virtual space content comprising topography and virtual objects, the implementation of the instance of the virtual space facilitating user participation in the virtual space, the user participation including controlling one or more available virtual objects to interact with the virtual space and one or more other virtual objects present in the virtual space, the control being exercised through user input via individual computing platform associated with individual users;
determining views of the virtual space by associating virtual space content with discrete layers that define the views of the virtual space, individual layers corresponding to different depths of simulated depth-of-field within the views, the layers comprising a first layer corresponding to a first simulated depth-of-field, a second layer corresponding to a second simulated depth-of-field, and a third layer corresponding to a third simulated depth-of-field; and
effectuating presentation of views of the virtual space at computing platforms associated with individual users, including effectuating presentation of views of the virtual space at a first computing platform comprises:
rendering views of virtual space content associated with the first layer in real time based on user input by generating information defining the views of the virtual space content associated with the first layer, wherein the virtual space content associated with the first layer comprises one or more user-controlled virtual objects and a set of one or more non-user controlled objects present in the first layer, wherein rendering views of the virtual space content associated with the first layer in real time based on user input comprises rendering such views to reflect interactions between the one or more user-controlled virtual objects and the individual non-user controlled objects included in the set of one or more non-user controlled objects present in the first layer in accordance with user input controlling the one or more user-controlled virtual objects;
obtaining, for the second layer, one or more pre-rendered views of virtual space content associated with the second layer, the one or more pre-rendered views of the virtual space content associated with the second layer being obtained by obtaining pre-existing information defining the views of the virtual space content associated with the second layer;
obtaining, for the third layer, one or more pre-rendered views of virtual space content associated with the third layer, the one or more pre-rendered views of the virtual space content associated with the third layer being obtained by obtaining pre-existing information defining the views of the virtual space content associated with the third layer; and
compositing the second layer and third layer into a composited layer.

11. The method of claim 10, wherein rendering the first layer, obtaining one or more pre-rendered views of the virtual space content associated with the second layer and the third layer, and compositing the second layer and the third layer into the composited layer are performed at a server that is remote from the first computing platform, and wherein effectuating presentation of views of the virtual space at the first computing platform further comprises:
effectuating transmission of the first layer and the composited layer from the server to the first computing platform over a network.

12. The method of claim 10, wherein rendering the first layer is performed at the first computing platform, wherein obtaining one or more pre-rendered views of virtual space content associated with the second layer and the third layer, and compositing the second layer and the third layer into the composited layer are performed at a server that is remote from the first computing platform, and wherein effectuating presentation of views of the virtual space at the first computing platform further comprises:
effectuating transmission of the composited layer from the server to the first computing platform over a network; and
compositing, at the first computing platform, the first layer with the composited layer.

13. The method of claim 10, further comprising:
determining, for individual layers, one or more areas of the individual layers that are to be rendered transparent, such that for the first layer determine a first area that is to be rendered transparent, and for the second layer, determine a second area that is to be rendered transparent.

14. The method of claim 10, wherein virtual space content associated with the second layer comprises a second set of one or more non-user controlled virtual objects positioned within the topography of the virtual space; and
wherein virtual space content associated with the third layer comprises the topography of the virtual space.

15. The method of claim 10, wherein effectuating presentation of views of the virtual space at the first computing platform further comprises:
obtaining, at a first point in time, a first set of pre-rendered views of virtual space content associated with the second layer; and
obtaining, at a second point in time, a second set of pre-rendered views of virtual space content associated with the second layer.

16. The method of claim 10, wherein the one or more pre-rendered views of virtual space content associated with the second layer, and the one or more pre-rendered views of virtual space content associated with the third layer comprise video feeds.

17. The method of claim 10, wherein virtual space is a three-dimensional virtual reality space.

18. The method of claim 10, wherein the virtual space includes a game taking place in the virtual space, wherein the one or more available virtual objects controlled by the users including game characters associated with the users.

\* \* \* \* \*